T. A. ASH.
RIM SPREADER AND CONTRACTOR.
APPLICATION FILED MAY 13, 1919.

1,321,584.

Patented Nov. 11, 1919.

Inventor
Thomas A. Ash.
By Morsell & Keeney,
Attorneys.

UNITED STATES PATENT OFFICE.

THOMAS A. ASH, OF MILWAUKEE, WISCONSIN.

RIM SPREADER AND CONTRACTOR.

1,321,584.  Specification of Letters Patent.  Patented Nov. 11, 1919.

Application filed May 13, 1919. Serial No. 296,831.

*To all whom it may concern:*

Be it known that I, THOMAS A. ASH, a citizen of the United States, and resident of Milwaukee, in the county of Milwaukee and State of Wisconsin, have invented new and useful Improvements in Rim Spreaders and Contractors, of which the following is a description, reference being had to the accompanying drawings, which are a part of this specification.

The present invention relates to certain new and useful improvements in a combined rim spreader and contractor, and has for its primary object to provide positive means for spreading or contracting automobile rims to permit the removal therefrom or securement thereto of automobile tires.

A further object of this invention is to provide a combined automobile rim spreader and contractor which is adapted for use with any style of rim.

A further object of this invention is to provide a combined rim spreader and contractor which is capable of being folded for convenience in carrying the same, and which will be efficient, durable and practical.

With the above and other objects in view which will appear as the description proceeds, my invention resides in the novel construction, combination and arrangement of parts substantially as hereinafter described, and more particularly defined by the appended claims, it being understood that such changes in the precise embodiment of the herein disclosed invention may be made as come within the scope of the claims.

In the accompanying drawing I have illustrated one complete example of the physical embodiment of my invention constructed according to the best mode I have so far devised for the practical application of the principles thereof, and in which.

Figure 1:
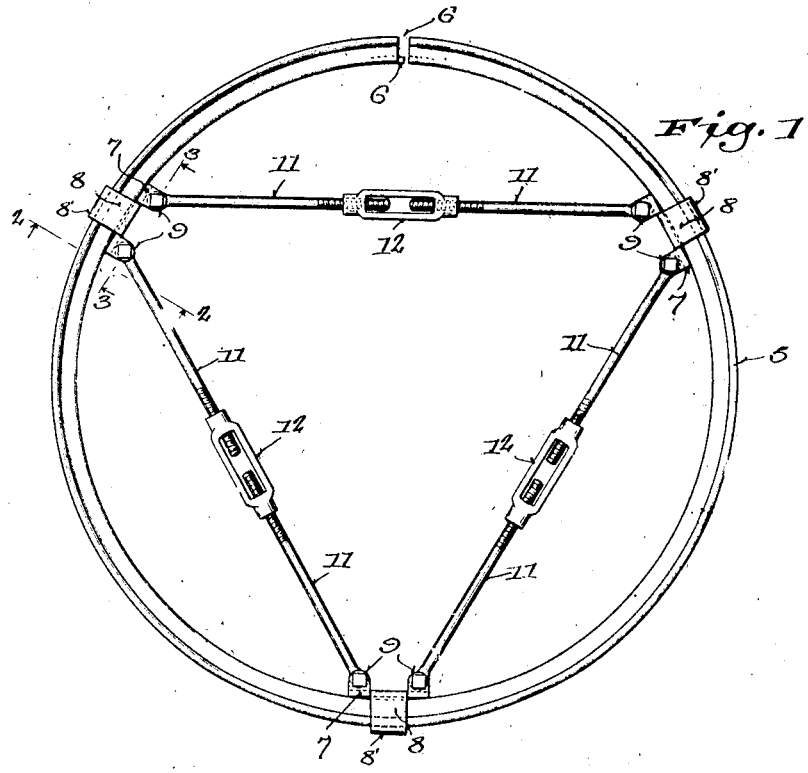
Figure 1 represents a side plan view of a split detachable rim for automobiles, with my invention applied thereto.

In the accompanying drawing, 5 designates an automobile rim which is split as of 6, and engaging the inner periphery of the rim and spaced substantially 120° apart are a plurality of rim engaging members 7, each having one side thereof provided with an outwardly projecting lug 8 adapted for engagement with the side of the rim and the end of said lug bent inwardly to form a rim engaging lip of hook 8'. Each member 7 has formed on each end thereof a pair of inwardly extending spaced ears 9 between which are pivoted outer ends 10 of the two-part extensible rods connecting each adjacent pair of members 7, each including a pair of like rods 11 having their inner ends threaded for engagement with a turn buckle 12.

Figure 2:
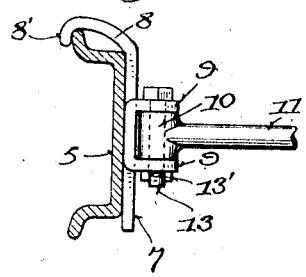
Fig. 2 is a sectional view taken through Fig. 1 on the line 2—2.
Figure 3:
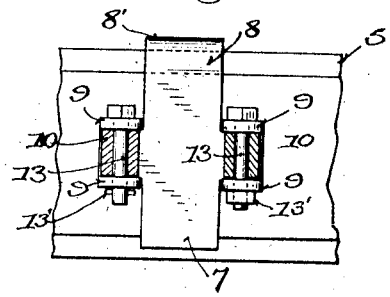
Fig. 3 is a view, part in section and part in elevation, said view being taken on the line 3—3 of Fig. 1.

In operation, the members 7 are placed in engagement with rim 5, the flanges 8 positioning my invention with respect thereto and the lips or hooks 8' engaging one side peripheral edge of the rim, as best shown in Fig. 2, and the turn buckles 12 are then turned to contract the two-part rods, thereby disconnecting the fastening means 6' at the meeting end 6 of the rim, causing one end of the rim to ride under the other end to permit the ready removal of the tire therefrom. To secure a tire to the rim, the operation is practically the same, in that the tire is positioned on the rim and then turn buckles 12 rotated to extend the rods and thus lock the meeting ends of the rim.

Figure 4:
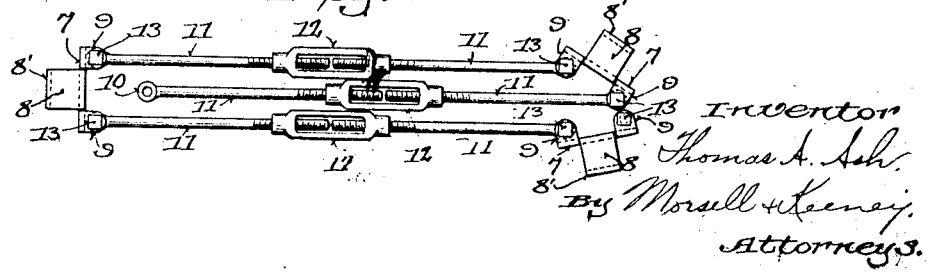
Fig. 4 is a plan view of my invention detached from a rim, the same being folded for storage.

When not in use, my invention may be folded as illustrated in Fig. 4 by removing one of the pivots 13 of the connecting rods which is held in position by a detachable cotter or other suitable fastening means 13', and then folding the same as shown in Fig. 4.

The members 7 are stamped from a single piece of metal, thereby producing a strong but inexpensive device, and it will be readily seen that I provide a positive means for spreading or contracting automobile rims.

What I claim as my invention is:

1. A rim spreader and contractor, comprising a plurality of rim engaging members, an outwardly extending hook member formed on each rim engaging member, inwardly projecting ears formed on said rim engaging members, a two-part extensible rod connecting each adjacent pair of said rim engaging members, the outer ends of said rods being pivoted to the ears of said members, and a turn-buckle adjustably connecting the inner ends of each rod, one pivot of one of said extensible rods being readily removable for convenience in folding the entire device for storage.

2. A rim spreader and contractor, comprising a plurality of rim engaging members, and an extensible and contractible rod connecting each adjacent pair of said rim engaging members, the outer ends of said rods being pivoted to said rim engaging members, one pivot of one of said extensible rods being readily removable for convenience in folding the entire device for storage.

3. A rim spreader and contractor including a plurality of rim engaging members, each formed from a single piece of metal and comprising a base portion engageable with the inner periphery of a rim transversely thereof its entire width, an outwardly and inwardly extending hook member formed on one end thereof and engageable over the adjacent side of the rim, the other end terminating adjacent the other side of the rim, whereby the rim engaging members may be moved to force the rim inwardly or outwardly, inwardly projecting spaced apart ears formed on the inner face of said rim engaging members and arranged to be disposed centrally with respect to the rim, and extensible and contractible means pivotally connected with the ears of said rim engaging members.

In testimony whereof, I affix my signature.

THOMAS A. ASH.